Jan. 5, 1926.

O. K. ISENSEE

ATTACHMENT FOR STEERING WHEELS AND THE LIKE

Filed June 1, 1925

1,568,737

Inventor:
Otto K. Isensee,
By Blakeslee & Brown,
Attorneys.

Patented Jan. 5, 1926.

1,568,737

UNITED STATES PATENT OFFICE.

OTTO K. ISENSEE, OF EL MONTE, CALIFORNIA.

ATTACHMENT FOR STEERING WHEELS AND THE LIKE.

Application filed June 1, 1925. Serial No. 33,958.

*To all whom it may concern:*

Be it known that I, OTTO K. ISENSEE, a citizen of the United States, residing at El Monte, in the county of Los Angeles and State of California, have invented new and useful Improvements in Attachments for Steering Wheels and the like, of which the following is a specification.

This invention relates to attachments for steering wheels and the like, and has for an object the provision of a novel attachment which when attached to a wheel member such as a steering wheel may be used for rapidly turning such steering wheel at the desire of any operator.

The invention has for an object the provision of an attachment which may be readily combined with any desired member without the necessity of passing bolts or screws through such member.

Another object is the provision of an attachment which is self-contained as to its various units and so formed as to not weaken any member with which it is associated.

The invention in the simplest embodiment comprises a clamp carrying a rotatable knob, the clamp being so formed as to be readily carried by a member such as a steering wheel, and readily removed from such steering wheel. The handle is rattle proof and works freely and there is nothing in the device to get out of order.

The invention is inexpensive in manufacture, has few parts, and is sightly in appearance.

With the above and other objects in view, the invention consists in the novel and useful provision, formation, construction, association and relative arrangement of parts, members and features, all as detailed in certain of its embodiments in the accompanying drawing, described generally and more particularly pointed out in claims.

In the drawing.

Corresponding parts in all the figures are designated by the same reference characters.

Figure 1:
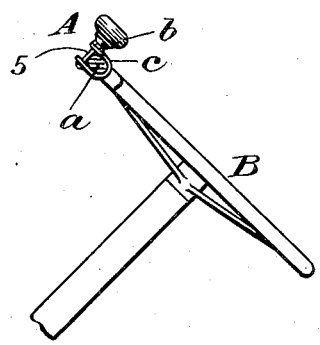
Figure 1 is a fragmentary side elevation of a steering wheel and column and showing the improved attachment associated with the rim of such steering wheel.
Figure 2:
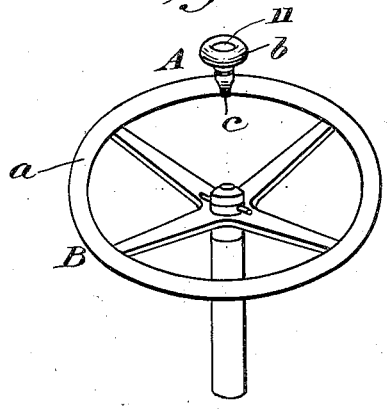
Figure 2 is a perspective view of a steering wheel and the attachment carried on the rim of such steering wheel.

Referring with particularity to the drawing, the improved attachment for steering wheels and the like is designated as an entirety by A, and the same may be used in conjunction with a steering wheel B by applying the same to some portion of the rim *a* of such steering wheel.

Figure 3:
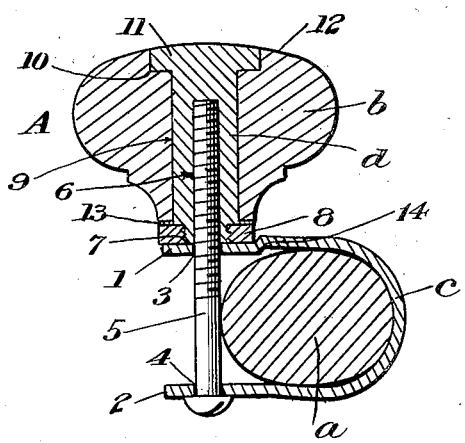
Figure 3 is a cross sectional view showing the construction of the attachment; and, Figure 4 is a detailed view showing certain parts of the attachment.
Figure 4:
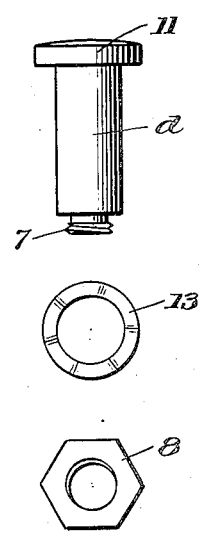

The said attachment A includes a knob *b*, a clamp member *c* which, as Figure 3 shows, is adapted to embrace the rim *a* of the steering wheel B, and which clamp is substantially U-shaped having two portions that extend beyond the normal periphery of such steering wheel rim as indicated at 1 and 2 and such portions are provided with aligned transverse bores 3 and 4 through which a screw-threaded bolt 5 is passed for screw-threaded engagement with a pin *d* which pin is longitudinally bored and screw-threaded as indicated at 6 for reception of such bolt 5, the said pin *d* being reduced as to diameter and screw-threaded as shown at 7, the screw threads at 7 being left-handed threads, while the screw threads for the bolt 5 are preferably right-handed threads, and screw-threaded upon such threads 7 is a nut 8. The said handle *b* is bored as indicated at 9 so as to receive and confine such pin *d* and likewise provided with a bore of enlarged diameter as shown at 10 so as to closely confine the head 11 of such pin *d* and so that the peripheral surface as indicated at 12 of such handle forms a continuation of the head of the pin. Included between the base of such handle and a surface of the nut 8 is a washer 13, the surface of which is transversely fluted so as to exert a pressure between the base of such handle and the nut, the purpose being to take up any rattle that might exist between such parts. In assembling the device the bolt 5 is removed from the clamp *c*, whereupon the clamp may slip upon the rim *a* of the steering wheel *b* at any desired location.

The bolt is then re-inserted through the bores 3 and 4, which, it is apparent will close entrance within the clamp and function to confine the rim within the clamp. The bolt is then screw-threaded within the pin *d* so as to tighten the clamp about the rim.

The clamp *c* is off-set transversely at 14 so as to lock the nut 8 against rotation when the device is in position on a steering wheel.

The operation of course is apparent, as an operator of the steering wheel only has to grasp said handle b to move the steering wheel to any desired position. It is evident that the provision of the attachment A allows a more ready handling of such steering wheel and much easier manipulation of the steering wheel.

It is evident that by providing a portion of the pin with left screw threads, as indicated at 7, and the bolt 5 with right-handed screw threads, that there is a locked relation as between such members when the nut 8 is received upon the left-handed screw threads and is confining the knob b on such pin. Rotation of the knob cannot in any way affect the bolt 5 and release the same from the pin, and hence the bolt 5 will at all times hold the clamp member in close embrace on any member with which it is associated.

It is obvious that various minor changes and modifications may be made in practicing the invention, in departure from the particular showing of the drawing, without departing from the true spirit of the invention.

Having thus disclosed my invention, I claim and desire to secure by Letters Patent:

1. A knob attachment for steering wheels, comprising a clamp adapted to embrace the rim of the steering wheel, and means common to the clamp and the knob for securing the same in working relation to the steering wheel.

2. A device of the character disclosed, including a clamp, a pin, and means common to the clamp and pin for securing the said pin to such clamp; there being a knob rotatably carried by such pin.

3. A device of the character disclosed, including a clamp, a pin, a knob carried on such pin, a bolt having right-handed screw threads screw-threaded within such pin, and a nut provided with left-handed threads screw-threaded externally on such pin, said nut functioning to hold the knob to such pin.

4. A device of the character disclosed, including a clamp, a pin, a knob carried on such pin, a bolt having right-handed screw threads screw-threaded within such pin, and a nut provided with left-handed threads screw-threaded externally on such pin; there being a fluted washer between the knob and said nut and said nut being received as between a portion of the clamp and such washer.

5. A device of the character disclosed, including a clamp, a pin, a knob carried on such pin, a bolt having right-handed screw threads screw-threaded within such pin, and a nut provided with left-handed threads screw-threaded externally on such pin, said nut functioning to hold the knob to such pin; said clamp being formed to lock the nut against rotation.

6. In a device of the character disclosed, a clamp adapted to be mounted on a steering wheel, a knob, and means adapted to secure said clamp to said steering wheel, and likewise secure said knob and clamp in working relation.

7. A knob attachment for steering wheels including a U-shaped clamp member adapted to transversely embrace a portion of the rim of said steering wheel, a knob member associated with said clamp, and means common to the clamp and the knob for securing the same to the rim of the steering wheel.

In testimony whereof, I have signed my name to this specification.

OTTO K. ISENSEE.